Figure 1:
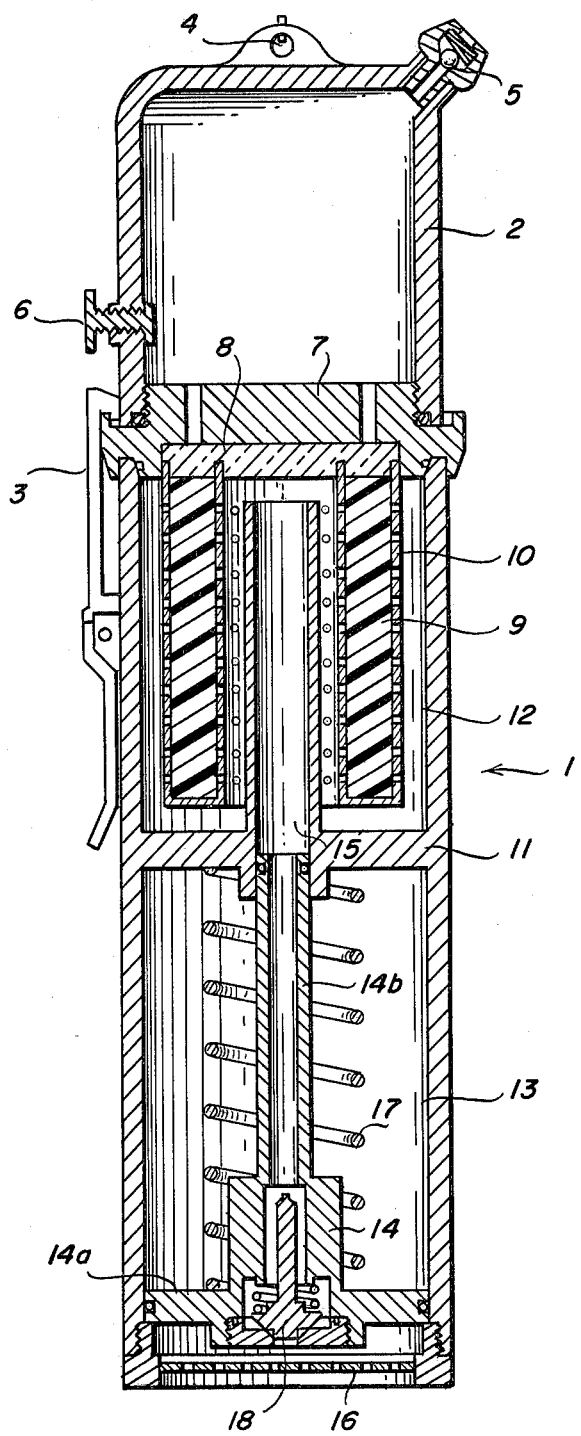

United States Patent [19]

Lopez

[11] 4,452,696

[45] Jun. 5, 1984

[54] REVERSE-OSMOSIS APPARATUS FOR PRODUCING FRESH WATER FROM SEAWATER

[76] Inventor: Fernand Lopez, 27 rue Emile Barrière, 31200 Toulouse, France

[21] Appl. No.: 365,898

[22] Filed: Apr. 6, 1982

[30] Foreign Application Priority Data

Apr. 6, 1981 [FR] France ................................ 81 07185

[51] Int. Cl.³ ............................................. B01S 31/00
[52] U.S. Cl. .................................. 210/170; 210/242.1; 210/433.2
[58] Field of Search ............... 210/416.1, 321.1, 433.2, 210/242.1, 170

[56] References Cited

FOREIGN PATENT DOCUMENTS 1050899  3/1979  Canada ............................ 210/321.1

OTHER PUBLICATIONS

Binder, Fluid Mechanics, 1950, pp. 317–324.

Primary Examiner—Frank A. Spear, Jr.
Attorney, Agent, or Firm—Shlesinger, Arkwright, Garvey & Fado

[57] ABSTRACT

The invention concerns a fresh-water producing apparatus to be immersed in a marine medium and of the type comprising at least one reverse-osmosis selective semi-permeable membrane.

This apparatus comprises three stages: a fresh-water stage consisting of collecting means for the produced chamber provided with a semi-permeable membrane placed between this chamber and the fresh-water collecting means; and, a third stage comprising a mobile piston and an hermetic chamber having a gaseous atmosphere. The piston is designed to enter in variable depth the high-pressure chamber by one side having an effective area s and comprising an opposite side with an effective area S exceeding the area s and arranged to be at the pressure of the marine medium.

28 Claims, 13 Drawing Figures

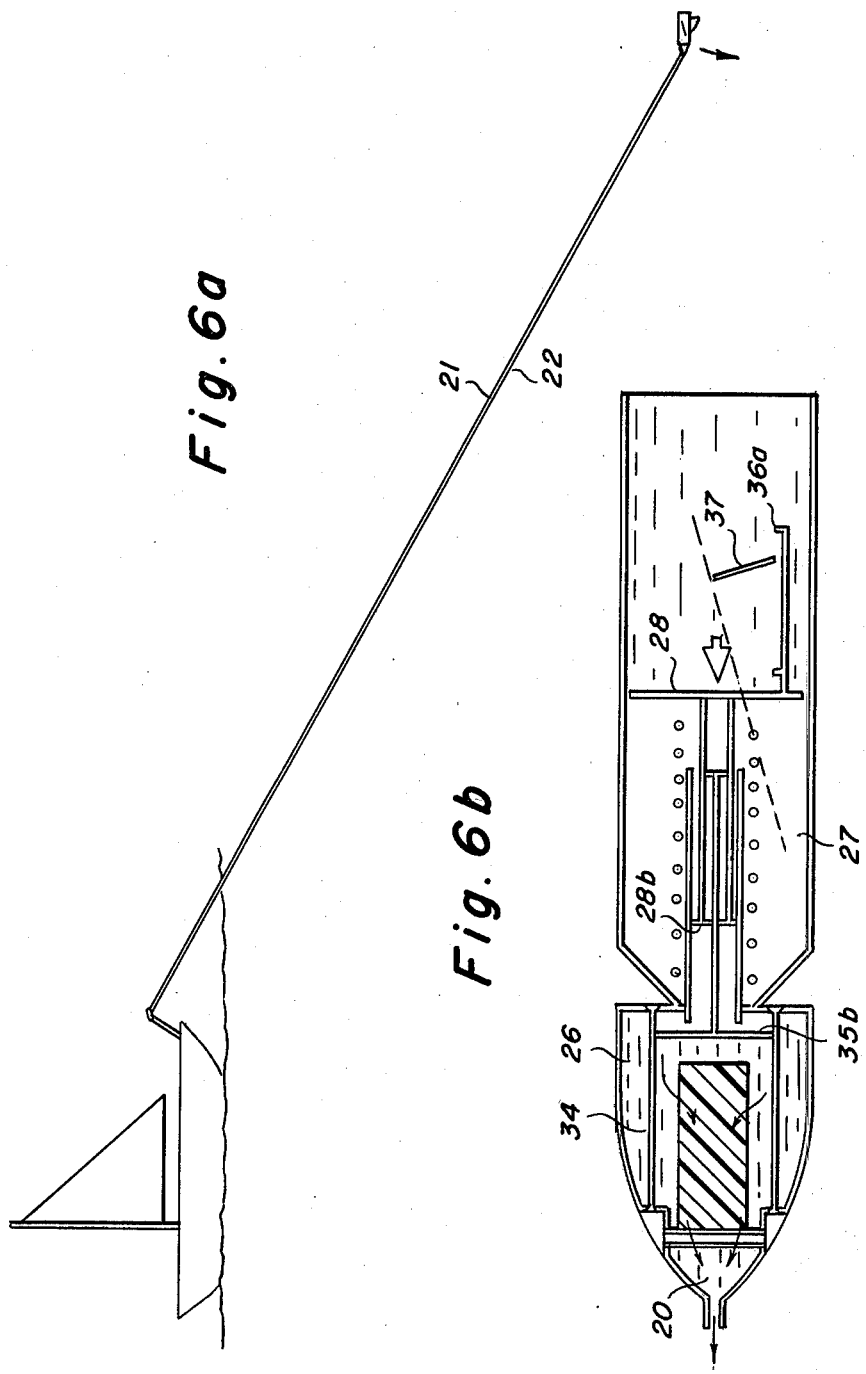

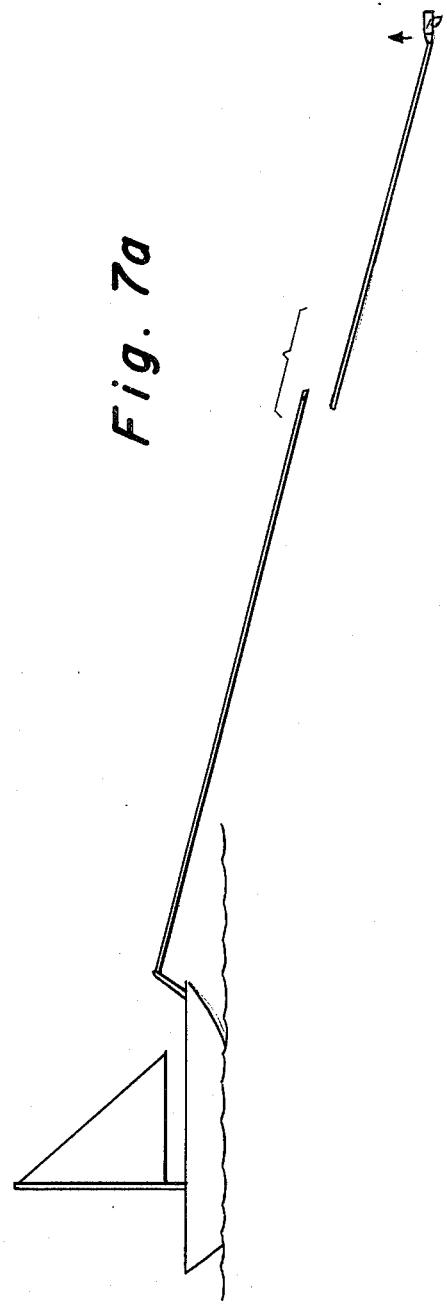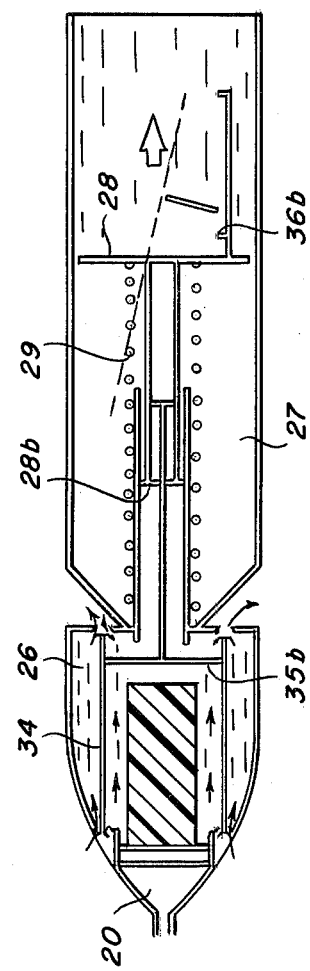
Fig. 7a
Fig. 7b

REVERSE-OSMOSIS APPARATUS FOR PRODUCING FRESH WATER FROM SEAWATER

The invention concerns an apparatus for producing fresh water from seawater, by filtering through one or more selective semi-permeable reverse osmosis membranes. It covers the various applications of the apparatus, in particular for creating a survival device capable of providing fresh water to the shipwrecked, or to supply a ship with fresh water, or else yet to produce industrially fresh water from a coastal platform.

The reverse osmosis phenomenon is well known presently and several methods make use of it to desalinate seawater. One approach consists in forcing the salt water flow at a high pressure exceeding the osmotic pressure into an envelope provided with a reverse-osmosis, selective semi-permeable membrane; the essential conditions for implementing these methods are on one hand achieving the high flow pressure (the osmotic pressure is proportional to the salinity which is very high for seawater, on the order of 25 bars for instance for a salinity of 35 g/l), and on the other hand the need of creating a steady water flow at the membrane surface to avoid increasing the salinity of the water near the membrane; these conditions constrain the presence of powerful pumping sets resulting in costly installation using substantial power. In particular it is wholly inconceivable to carry out this method on small boats lacking the required power, and much more so on rescue crafts lacking any kind of power source.

Another approach consists in immersing a reverse-osmosis apparatus comprising a semi-permeable membrane and a fresh-water collecting tank to a sufficient depth for the ambient pressure to be substantially higher than the osmotic pressure. For instance for a salinity of the order of 35 g/l, this depth must exceed 300 meters and if possible be on the order of 450 to 500 meters in order to achieve satisfactory filtering rates. This restriction considerably lessens the practical interest of these immersion apparatus which apparently have not been put to use to-date.

The present invention has as its object to provide a new apparatus using the phenomena of reverse osmosis for seawater desalination which is free of the drawbacks or limitations of the known methods.

One object of the invention in particular is to provide an immersion-type apparatus requiring much lesser depths of immersion than those needed in the known apparatus of this kind.

Another object is to limit the saline-concentration phenomena near the membrane(s) of the apparatus in order to eliminate its (their) drop in efficiency after a given operational time.

It is furthermore the object of the invention to describe specific applications of said apparatus, on one hand in the area of survival in case of shipwreck, and on the other hand in the area of supplying boats with fresh water, lastly in the field of the industrial production of fresh water near the coasts.

To those ends, the apparatus of the invention—which is of the type comprising at least one selective semi-permeable membrane designed to achieve filtration by reverse osmosis of seawater, comprises three stages:

a first stage constituted by collection means for the produced fresh water, a second stage consisting of a chamber, the so-called high-pressure chamber, which is provided with the semi-permeable membrane(s), each membrane being placed between the high-pressure chamber and the fresh-water collecting means so that one of the active sides of the membrane communicates with said collection means and the other active side communicates with said high-pressure chamber, a third stage comprising a mobile piston and a hermetic chamber with a gaseous atmosphere and designed to allow the displacement of said piston which is designed to enter the high-pressure chamber in variable depth and by a side of effective areas, and comprising an opposite side with an effective area exceeding the areas, designed to be at the pressure of the marine medium.

The term "active sides" of the membrane(s) means those parts of it (them) which in the reverse osmosis mechanism form, on one hand, the interface with the salt, water, and on the other hand, the interface with the pure water. As regards a plane membrane consisting of several layers of a semi-permeable, selective material, these active sides consist of the two opposite sides of the membrane. As regards a helically coiled membrane, they consist on one hand of the two outer walls in the coiled shape of the membrane and on the other of the two inside walls of this membrane. As regards a semi-permeable membrane consisting of a multitude of hollow capillary fibers in loop shape, these active sides consist on one hand of the outer cylindrical surfaces of the fibers and on the other hand of the inner cylindrical surfaces of their capillary channels; this type of membrane is preferred in general. The material being used can be any appropriate known type, in particular one based on cellulose acetate or aromatic polyamides.

Preferably the mobile piston entering the high-pressure chamber is designed in such a manner that the ratio of its surfaces, S/s, be approximately between 15 and 40.

As will be more clearly seen below, the device of the invention is immersed in the water to a depth which depends on the ratio S/s (of the order of 15 to 35 meters in the above cited example); this depth is much less than the one required in the known immersion apparatus (450 to 500 meters) and determines operation of the semi-permeable membrane(s) at a pressure of the order of 50 bars, which is optimal with respect to the osmotic filtering efficiency. Such a device therefore is freed from the drawbacks and limitations of the known apparatus, while also operating in better conditions.

Depending on the application, the fresh-water collecting means may comprise a tank provided with means for drawing the collected water, or else a chamber provided with a flexible water drain conduit. In the former case the fresh water is removed by raising the tank to the surface; in the latter case, it is removed through a conduit fitted to connect the device to the surface. It must be kept in mind that in view of the high pressure in the high-pressure chamber (of the order of 1.5 to 3.5 bars) flow to the surface can take place naturally without pumping means.

Within the scope of a first type of application, the apparatus of the invention can be adapted to perform as a survival device for the shipwrecked. In that case its volume preferably shall be roughly between 0.5 and 2 liters and it will comprise a cable-fixing means for the purpose of manual immersion, possibly by means of a short rod provided with a winch or any other similar member.

In this application the fresh-water tank is preferably made of a transparent material and is detachably fixed to the end of the high-pressure chamber for instance by means of a snap-in system. Before the device is immersed, the tank is removed and the high-pressure chamber is filled with seawater; then the tank is put back in place and the device is submerged to the proper depth, in particular to between 15 and 35 meters. This shallow depth makes it easy to carry out the implementing procedure, which therefore is feasible practically in any part of the seas. At that depth, the piston generates a compression on the water contained in the high-pressure chamber and raises this water to a pressure which very much exceeds the osmotic pressure. Thereupon the phenomenon of reverse osmosis takes place and a volume of water (equal to the volume swept by the piston in the high-pressure chamber) is filtered through the membrane and collected in the tank. Thereupon the apparatus can be raised to the surface.

In an implementing mode described further below, the apparatus is provided with means for returning the piston to its initial position during the ascent and with a valve system permitting seawater intake to the high-pressure chamber during said ascent. The high-pressure chamber then is automatically filled at each ascent, the user then having only to perform the required number of descents and ascents to fill the tank with fresh water.

Within the scope of a second type of applications, the device of the invention is designed to be towed by a boat for the purpose of supplying it with fresh water. In that case it assumes the shape of a hydrodynamic body and has a volume between several and a few tens of liters. This body also has a traction cable fixed to its fore and a flexible flow conduit for the fresh water tied to said cable to which it is parallel as far as the boat.

In an implementation mode further described in detail below, this apparatus comprises on one hand a valve system generating during the ascent a sweep of the high-pressure chamber by the seawater, and on the other hand, outside the body, at least one orientable flap designed to generate the ascent or descent of the device as a function of the position of said flap. A control mechanism for said flap(s) furthermore is provided at the piston of the device so that said flap(s) be controlled either toward the ascent position when the piston reaches the end of its stroke toward the high-pressure chamber or toward the descent position when the piston reaches its opposite stroke end.

In this manner the device described above follows the stern of a boat while successively descending and ascending. In the course of each ascent, the high-pressure chamber is rinsed and its water is entirely renewed, whereby salts are prevented from concentrating in this chamber at the end of the various ascent and descent cycles.

Lastly, within the scope of a third type of application, the apparatus of the invention is designed for industrial production of fresh water from a coastal platform or another similar floating contraption. In that case its volume is approximately between several hundreds of liters and several tens of m³ and it is connected to a vertical-displacement cable at the platform. It may also be associated with a continuous ascent and descent system actuating several apparatus.

As in the previous case, the apparatus object of this field of application advantageously comprises a valve system generating a flow of seawater during the ascent through the high-pressure chamber to ensure sweeping this chamber and renewing its water.

Figure 2A:
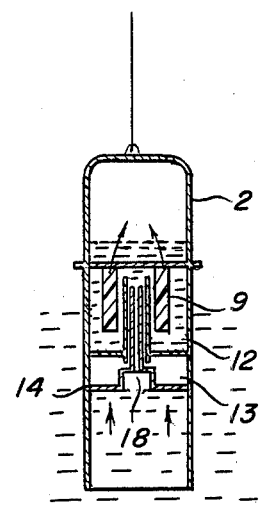
Figure 2B:
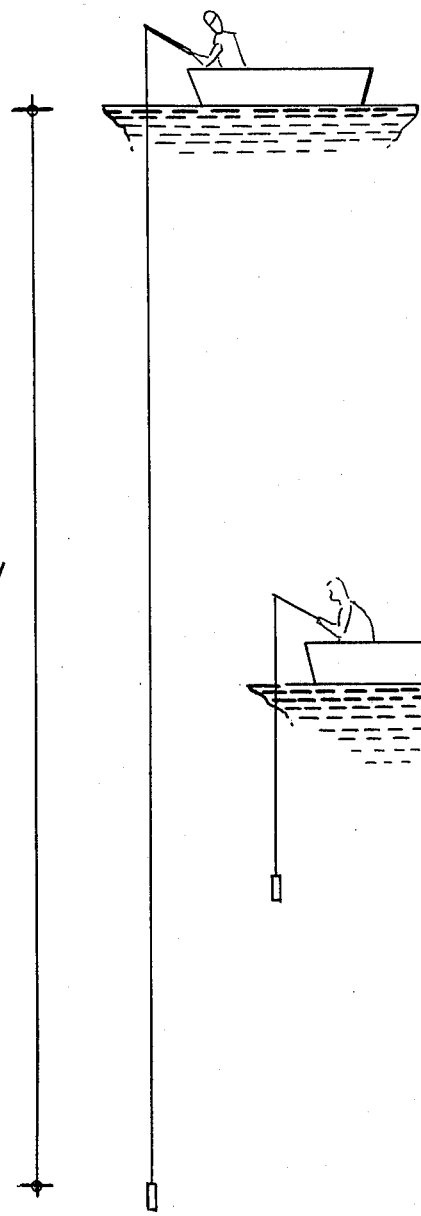
Figure 3A:
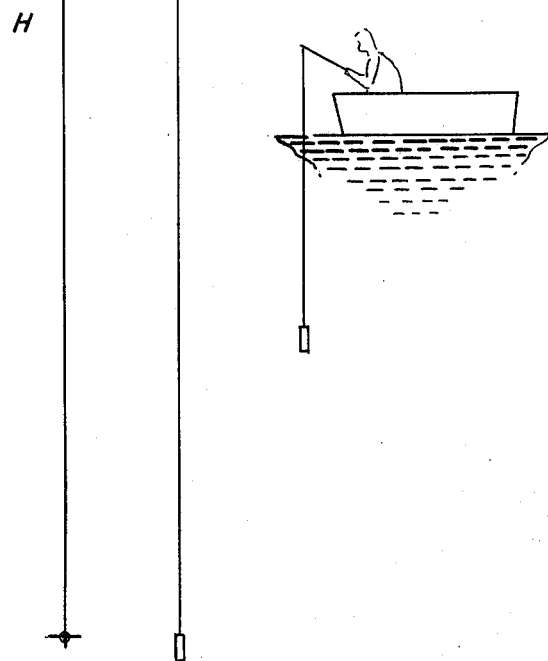
Figure 3B:
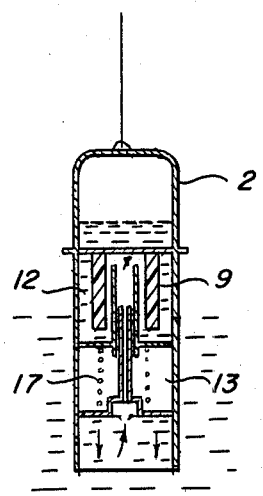
Figure 4:
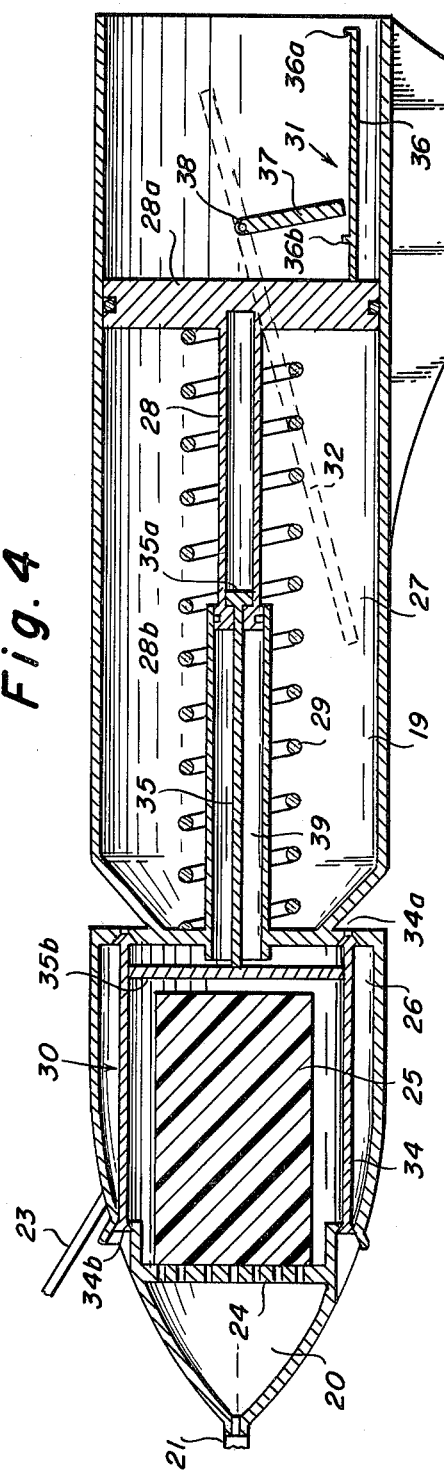
Figure 5:
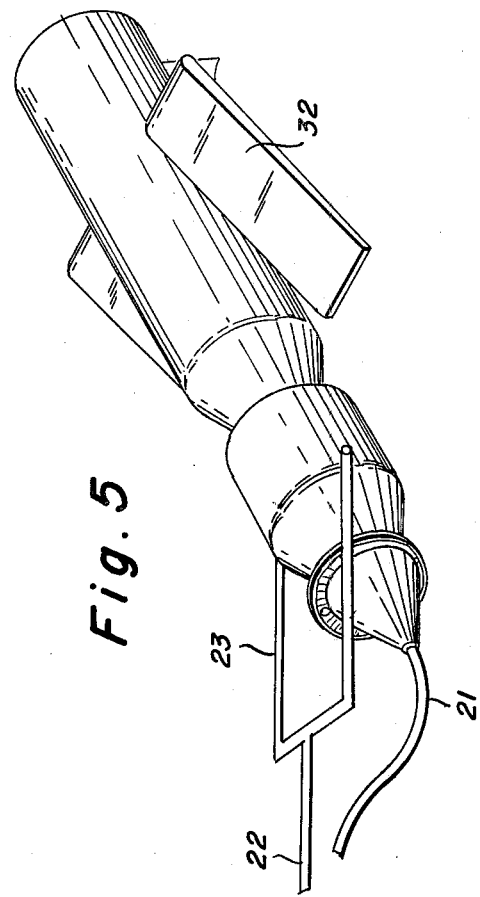
Figure 8:
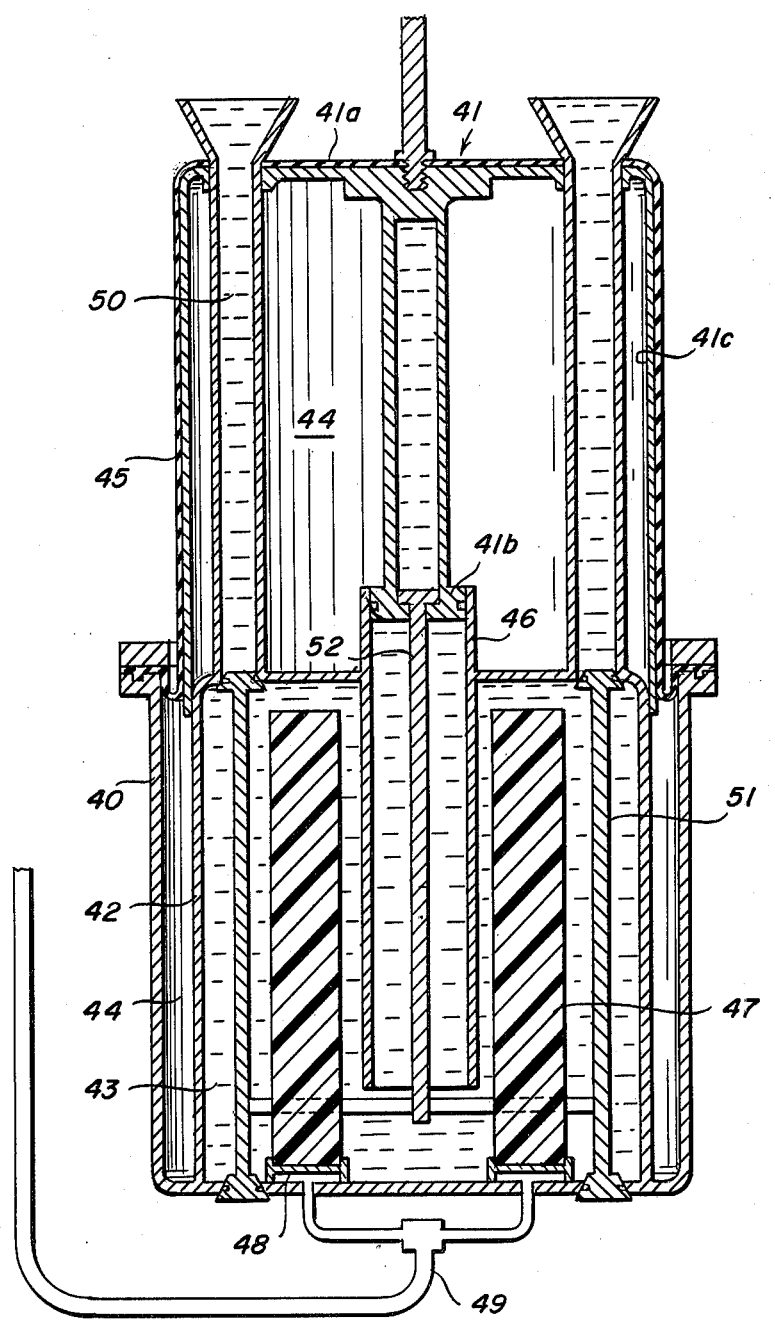
Figure 9:
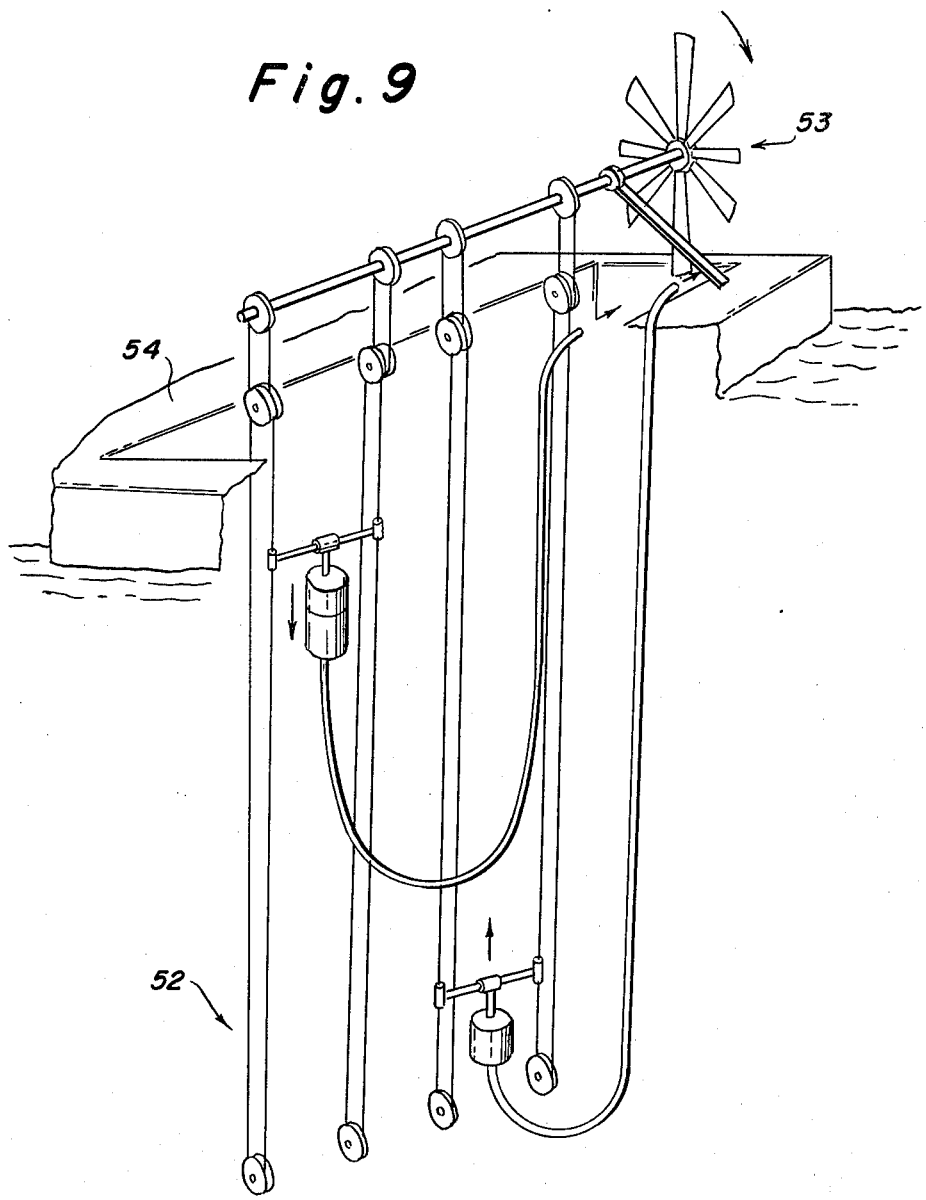

Other features, purposes and advantages of the invention will become clear in relation to the description below in relation to the attached drawings which illustratively show three versions of the apparatus corresponding to the three above-cited applications, these drawings are an integral part of the present description:

FIG. 1 is an axial section nearly on a scale of 1 of a survival apparatus of the invention, FIGS. 2a, 2b, 3a, 3b are schematics illustrating the use of said apparatus and its operation, FIG. 4 is an axial section of an apparatus of the invention to supply fresh water to a boat, FIG. 5 is a schematic perspective, FIGS. 6a, 6b, 7a, 7b are schematics illustrating the operation of said apparatus, FIG. 8 is an axial section of an industrial apparatus for producing fresh water in accordance with the invention, FIG. 9 is a schematic illustrating a possible application of this apparatus.

The survival device illustratively shown in FIG. 1 is meant to be used in rescue crafts to permit the shipwrecked to produce fresh water from seawater even in shallow waters and by means of easily carried-out operations.

In this example, this apparatus comprises a cylindrical body 1 of elongated shape at the end of which a freshwater tank 2 is fastened by a snap-in system 3. The total volume of the entire device may be from about 0.7 to 0.9 liters.

The tank 2 is made of a transparent material and comprises a hook-up means 4 to which is fastened a cable 20 to 30 meters long. This tank is provided with means for drawing the collected water, in this example a valve-nipple 5 and an air inlet 6 which are to be actuated manually by the user to allow the water to leave through the nipple 5. The valve-nipple 5 also assumes the function of a safety valve.

The tank 2 is tightly closed by a lid 7 screwed into it. This lid is provided with a permeable membrane support 8 and is perforated by apertures to pass the fresh water having crossed the support 8 after being filtered through the membrane.

A reverse-osmosis selective semi-permeable membrane 9 is fixed to the support 8 and to the outer side of the tank 2, and in this example said membrane is in the shape of a cylindrical ring, being protected by a perforated envelope 10.

The cylindrical body 1 is divided by a partition 11 into a so-called high-pressure chamber 12 and a hermetic chamber 15 with a gaseous atmosphere. When the tank 2 is snapped onto the body 1, the membrane 9 inserts itself into the high-pressure chamber 12 as indicated in FIG. 1, one of its active sides (seawater interface) being immersed in the heart of the water in said chamber and the other active side (fresh-water interface) communicating with the tank 2.

Moreover the body 1 contains a piston 14 comprising a cylindrical disk 14a of an effective area $S_1$ of the order of 20 cm² and an axial extension 14b with an effective area $s_1$ of the order of 0.8 cm² (these values obviously being merely indicative).

The axial piston extension 14b is housed at its end in a cylinder 15 of conjugate cross-section and borne by the partition 11, said cylinder extending into the high-pressure chamber 12 and the gaseous-atmosphere chamber 13. This axial extension 14b enters said cylinder 15 in variable depth and its end is provided with a peripheral seal resting in said cylinder.

The disk 14a can move at the other end within the chamber 13 acting as its guiding cylinder; a peripheral seal assures tightness whereby this disk hermetically separates the gaseous-atmosphere chamber 13 from the outside medium. A protecting grid 16 may be provided at the end of the body 1.

Furthermore, a return spring 17 is located within the chamber 13 between the partition 11 and the piston disk 14a to act on this disk so it tends to move away from the high-pressure chamber 12.

It must also be borne in mind that the air pressure in the chamber 13 is in particular made to be equal to atmospheric pressure when the piston is away from the high-pressure chamber 12 (for convenience of manufacture). When the air is compressed, it exerts a return pressure adding to that of the return spring 17; where appropriate this spring might be eliminated by providing high air pressure in the chamber 13. Obviously the air pressure in the chamber 13 might also be less than the one discussed above; where appropriate this chamber might be at full or partial vacuum with a suitably strong spring.

The piston 14 also contains an axial channel and a recess housing a valve system 18. In the example, this system comprises a conical surface valve as shown in FIG. 1 to control the water intake to the high-pressure chamber 12 when the pressure of said chamber drops below the outside pressure (within the calibration constant provided by a valve spring acting toward the closed position).

When the valve 18 is closed, the piston 14 thereby is subjected at its effective surface $s_1$ to the pressure in the high-pressure chamber 12 and at its effective surface $S_1$ to the pressure of the outside marine environment.

The FIGS. 2a, 2b, 3a and 3b illustrate the operation and the use of the described survival device.

After the user has filled with seawater the high-pressure chamber 12 and snapped-in the tank 2, he immerses the device, in particular by means of a short rod and winch on which is wound the hook-up cable. The immersion depth H might be roughly 20 meters (FIG. 2a). At that depth the external pressure of about 2 bars is applied to the surface $S_1$ of the piston which thereby is forced back and by means of the surface $s_1$ the water in the high-pressure chamber 12 is subjected to a pressure of about 50 bars. This pressure is roughly twice the osmotic pressure of seawater of average salinity (about 35 g/l) and the reverse-osmosis phenomenon then takes place at a high filtration rate through the membrane 9. As filtration proceeds, the piston is forced back (FIG. 2b) until it reaches the end of its stroke at the high-pressure chamber side after a volume of fresh water equal to the volume of water displaced by the piston in the chamber 12 and the cylinder 15 has been filtered.

Thereupon the operator raises the device (FIG. 3a). The external pressure drops and the piston is pushed back by the spring 17 toward its initial position. The internal pressure in the chamber 12 then drops suddenly, whereby the valve 18 opens under the action of the external pressure (FIG. 3b). A set quantity of seawater is sucked into the chamber 12 which fills again. The operator can lower the device for the purpose of renewing the operations and obtaining a new quantity of fresh water until he has filled the tank 2.

When the latter contains an amount of fresh water which is deemed sufficient, the operator separates it from the body, removes the water, rinses the membrane and may start a new cycle.

Be it noted that in lieu of a single valve 18, the device also may be provided with a system of valves of the types described below, whereby an automatic sweeping of the high-pressure chamber 12 and rinsing of this chamber at each ascent will be ensured.

The FIGS. 4 and 5 illustratively show an apparatus for supplying a boat with fresh water and which is towed by this boat.

This apparatus comprises a fore body 19 with a hydrodynamic profile, in particular with an oval shape at the fore and a cylindrical shape at the rear. This body can be made integral or of several pieces, and illustratively its volume may be roughly from ten to twenty liters.

At the fore, the body 19 forms a fresh-water collecting chamber 20 connected to a flexible drain conduit 21. The conduit extends as far as the boat and is tied on its path to a traction cable 22 of the apparatus. In the example, this cable 22 is fastened to the fore part of the apparatus by means of a clevis 23 hinging about this apparatus.

The chamber 20 is closed at its rear part by a support 24 which bears a reverse-osmosis semi-permeable membrane 25. One of the active sides of this membrane communicates with the chamber 20 through apertures in the support 24 while the other active side is immersed in a high-pressure chamber 26 bounded by the body.

As in the previous apparatus, the third stage consists of a chamber 27 in a gaseous atmosphere containing a piston 28, composed of a disk 28 with an effective area $S_2$, moving within the cylinder forming the chamber 27 and of an axial extension having an end 28b with an effective area $s_2$ moving within a hollow cylinder 29 extending between the high-pressure chamber 26 and the chamber 27 at the gaseous atmosphere. Also, a return spring 29 acts to move the piston 28 away from the high-pressure chamber 26. (Illustratively, the effective area $S_2$ may be roughly 300 cm$^2$ and the effective area $s_2$ roughly 12 cm$^2$).

Also, the apparatus is provided on one hand with a valve system 30 designed to sweep the high-pressure chamber 27 with seawater in the course of the ascents and on the other hand with a control mechanism 31 designed to control orientable flaps such as 32 which control the device with respect to its pitching axis. Conventional stabilizing means such as fins 33 ensure that the device shall be well balanced with respect to its longitudinal axis.

The valve system 30 comprises one or several rod(s) 34 with double valves 34a, 34b located in the high-pressure chamber 27 around the membrane 25. The valves 34a, 34b of these rods function in concert with orifices which in this example are of conical topology and located oppositely in the high-pressure chamber, issuing into the outside.

The rod(s) 34 with double valves is (are) solidly joined to a control member 35 connected to the piston 28 so as to be actuated to open the valves when said piston reaches the end of its stroke toward the high-pressure chamber 27 and to close the valves when the piston arrives at the opposite stroke end.

In the example, the member 35 comprises an axial rod provided with a stop end means 35a fixed to a connecting piece 35 which rigidly fixes it to the rods 34. The stop end-piece 35a is actuated by the end 28b of the piston to close the valves and by the central inside part of the disk 28a to open them at the end of the opposite stroke.

Also, a conventional (omitted) snap-in system keeps the valves in the open or closed position, the drainage of the water around the device assures a natural return effect whereby if desired only a snap-in means for the open position need be provided.

Also, the control mechanism 31 for the flaps 32 may quite simply be composed of a strip 36 rigidly fixed to the piston. This strip is provided with two stops 36a and 36b for the ends of the strokes which can stop an actuating arm 37 rigidly joined to the hinge shaft 38 bearing the flaps. The stops 36a and 36b are so arranged that the contact with the arm 37 is made slightly before the pistons reach the ends of the two strokes.

The FIGS. 6a, 6b and 7a, 7b further describe the operation of the above described apparatus.

This apparatus is towed by a boat by a cable 22 about 50 meters long so it may submerge to a depth of about 20 meters with a cable slope less than 30°.

Assuming the apparatus is descending (FIG. 6a), the flaps 32 located at the rear of the conveyance are oriented as shown in FIG. 6b inclining downward and forward. The flow of the water on these flaps tends to pivot the apparatus downward to a depth where the couple exerted by the flaps about the pitching axis is equal to the cable traction.

Near this depth (which can be adjusted to about 20 meters by a suitable flap geometry), the external pressure of 2 bars forces back the piston 28 and generates a pressure of 20 bars in the high-pressure chamber 26. As for the previous apparatus, the reverse-osmosis effect takes place and the fresh water filters towards the collection chamber 20 and drains into the conduit 21.

After the piston 28 has been substantially forced to the front, it triggers two actions:

it opens the valve system 34 by the thrust of the inside central part of the disk 28a against the stop end-means 35a, it pivots the flaps 32 for ascent by displacing the the arm 37 when making contact with the end-of-stroke stop-means 36a.

The device then rises (FIG. 7a) and its high-pressure chamber is swept and rinsed by seawater which flows through it from the front orifices to the rear orifices whence it exits.

The force exerted on the return spring 29 forces the piston 28 to the rear (FIG. 7b), and, near the surface where the ambient pressure is low, the piston is again in the rear position. It triggers then two actions opposite to those already described, namely the closure of the valves 34 and the pivoting motion of the flaps 32 in the direction of descent.

Thereupon a new cycle of fresh-water production may begin. Be it noted that depending on the characteristics of the apparatus and on the pressure of the water obtained in the collection chamber 20, the fresh water may flow toward the boat through the conduit 21, either solely during the ascent phase (when the external pressure corresponding to the depth becomes less than the pressure in the collection chamber 20), or during the low-level phase and the ascents (if the pressure obtaining in the collection chamber exceeds the external pressure corresponding to the depth of the level).

The FIG. 8 illustratively shows another version of the apparatus, operating on the same basic principles as those already described. This equipment is intended for the industrial production of fresh water from a coastal platform.

It comprises a cylindrical body 40 of which the volume is roughly 1 to several m$^3$. This body is provided on one hand with a bell 41 acting as a mobile piston and capable of entering the body, on the other hand a cylindrical partition 42 arranged within said body and achieving the separation between a central high-pressure chamber 43 and a chamber 44 in which exists a gaseous atmosphere (said chamber extending along the periphery of the partition 42 and also into the volume of the bell 41).

The hermeticity between the body 40 and the bell 41 is provided by a flexible membrane 45 made of an elastomer or the like; this membrane is hermetically fixed along its rim on the periphery of the body 40 by conventional means.

The bell 41 comprises a circular side 41a with an effective area $S_3$, a lateral cylindrical wall 41c which can be inserted into the body 40 between same and the partition 42, and an axial extension 41b of which the end has an effective area $s_3$.

As above, this extension 41b can penetrate a hollow cylinder 46 of conjugate cross-section and extending between the high-pressure chamber 43 and the chamber 44 with the gaseous atmosphere. (Illustratively the area $S_3$ may be roughly $\frac{1}{2}$ m$^2$ and the effective area $s_3$ roughly 0.02 m$^2$).

In the example, the high-pressure chamber 42 contains a plurality of reverse-osmosis selective semipermeable membranes such as 47 which are distributed around the hollow drum 46, each membrane being in the shape of a finger and possibly consisting of hollow fibers.

Each membrane 47 is kept in place by a known-type support 48 which permits the transmission of the fresh water filtered through the membrane to a collection conduit (the set of these conduits forming the collection chamber) and then to a collector 49 which rises to the surface.

The equipment furthermore comprises seawater intake ducts 50 leading to the high-pressure chamber 43 and a valve system 51 similar in type to that of the previous system and driven by a similar actuation mechanism 52 when the piston reaches its stroke end in either direction.

As shown in FIG. 9, several of the devices of the above-described type can be combined into a water-production facility, being provided with means for alternatingly raising and lowering them between the surface and a depth down to 20 meters. These means can be arbitrary, and in particular include a cable system 52 functioning in concert with pulleys or winches driven by a motor means 53 borne on a platform 54.

FIG. 9 illustratively shows a permanent windmill drive system operating in a single drive-shaft direction of rotation.

The fresh-water production by reverse osmosis takes place by the same principles as for the previous means. It must be noted however that the apparatus is hooked up through the bell 41 to the suspension means, whereby a return spring need no longer be provided. The bell 40 (which acts as the piston) moves away from the body 40 during the ascents, after the valves are opened, by the sole action of the device's weight.

Be it noted especially with respect to this last mode of implementation that the gaseous-atmosphere chamber 44 can be provided with an air blow-off conduit whereby it communicated with the surface.

Obviously the invention is not restricted to the expressions of the above description, but rather covers all variations.

I claim:

1. A reverse-osmosis fresh water from seawater system adapted for being submersed in a marine medium, comprising:
   (a) fresh-water collecting means;
   (b) a high-pressure chamber adapted for containing seawater therein;
   (c) an hermetic chamber;
   (d) a semi-permeable membrane positioned in said high-pressure chamber and adapted for reverse-osmosis separation of fresh water from seawater and having a fresh water side in fluid communication with fresh water collecting means and a salt water side immersible in salt water containable in said high-pressure chamber;
   (e) pressure application means associated with said hermetic chamber and in pressure communication with said high-pressure chamber for applying pressure to seawater containable therein whereby fresh water flows through said semi-permeable membrane to said fresh water collecting means thereby; and
   (f) valve means in fluid communication with said marine medium and said high pressure chamber for filling said high-pressure chamber with seawater.

2. A system as defined in claim 1, further comprising:
   (a) fresh-water withdraw means associated with said fresh-water collecting means for withdrawing collected fresh water.

3. A system as defined in claim 2, further comprising:
   (a) said fresh-water collecting means including a collecting tank detachably sealed to said high-pressure chamber;
   (b) support means secured to said collecting tank and disposed between said collecting tank and said high-pressure chamber and having fresh water distribution means therethrough in fluid communication with said semi-permeable membrane and said fresh-water collecting tank; and,
   (c) said semi-permeable membrane secured to said support means and extending into said high-pressure chamber when said collecting tank is sealed to said high-pressure chamber.

4. A system as defined in claim 3, wherein:
   (a) said support means including a threaded lid;
   (b) said collecting tank having interior threads in threaded engagement with said lid threads;
   (c) a membrane support secured to said lid opposite said fresh-water collecting tank for supporting said semi-permeable membrane; and,
   (d) a plurality of apertures aligned with said semi-permeable membrane and traversing said membrane support and said lid.

5. A system as defined in claim 3, wherein:
   (a) a snap-in system detachably sealing said collecting tank to said high-pressure chamber.

6. A system as defined in claim 1, further comprising:
   (a) said fresh-water collecting means including a collecting chamber; and,
   (b) a flexible conduit extending from and sealed to said collecting chamber for withdrawing collected fresh water.

7. A system as defined in claim 6, further comprising:
   (a) said system having a hydrodynamic profile adapted for towing by a boat;
   (b) cable means secured to said boat and said system; and,
   (c) said flexible conduit secured to said cable means.

8. A system as defined in claim 7, further comprising:
   (a) at least one external orientable flap associated with said hermetic chamber and adapted for raising and lowering said system as said system is towed by said boat; and,
   (b) control means cooperating with said piston for controlling said at least one flap.

9. A system as defined in claim 6, wherein:
   (a) said collected fresh water being under pressure for forcing said collected fresh water through said flexible conduit.

10. A system as defined in claim 1, wherein:
    (a) said semi-permeable membrane including a plurality of loop shaped hollow capillary fibers.

11. A system as defined in claim 1, further comprising:
    (a) said hermetic chamber having a gaseous medium sealed therein;
    (b) a hollow cylinder secured to said high pressure chamber and having a portion extending into said hermetic chamber;
    (c) a pressure displaceable reciprocal piston positioned in said hermetic chamber co-axial with said cylinder and having a first portion displaceable through said cylinder; and,
    (d) said piston being displaceable from a first low-pressure position to a second high-pressure position associated with said piston first portion being displaced into said cylinder for applying pressure to said high-pressure chamber when said system is emerged in said marine medium to a pre-selected depth.

12. A system as defined in claim 1, further comprising:
    (a) return means cooperating with said piston for displacing said piston to said first low-pressure position when said system is at a pre-selected depth in said marine medium.

13. A system as defined in claim 12, wherein:
    (a) said return means including a coil spring coaxially mounted about said piston.

14. A system as defined in claim 11, wherein:
    (a) said fresh-water collecting means, said high-pressure chamber, and said hermetic chamber being coaxial.

15. A system as defined in claim 14, further comprising:
    (a) an envelope surrounding said semi-permeable membrane and having a plurality of apertures therethrough.

16. A system as defined in claim 15, wherein:
    (a) said valve means being coaxial with said pressure application means.

17. A system as defined in claim 16, further comprising:
    (a) said valve means including a displaceable control member cooperating with said pressure application means;
    (b) a first rod connected to said control member and displaceable therewith;
    (c) first and second valve means secured to said first rod and adapted for being opened and closed by said pressure application means as said piston is reciprocally displaced.

18. A system as defined in claim 16, wherein:

(a) said fresh-water collecting means, said high-pressure chamber, and said hermetic chamber being generally cylindrically shaped.

19. A system as defined in claim 15, wherein:
   (a) said collecting tank having a volume of between 0.5 and 2.0 liters.

20. A system as defined in claim 14, further comprising:
   (a) cable hookup means associated with said collecting tank for raising and lowering said system into said marine medium.

21. A system as defined in claim 11, wherein:
   (a) said piston first portion having a pre-selected area; and,
   (b) said piston having a second portion positioned in said hermetic chamber and a pre-selected area exceeding said first portion pre-selected area.

22. A system as defined in claim 21, further comprising:
   (a) said piston second portion having a peripheral seal for maintaining said gaseous medium in said hermetic chamber.

23. A system as defined in claim 22, wherein:
   (a) said hermetic chamber being generally cylindrical and adapted for guiding said piston second portion therein.

24. A system as defined in claim 21, wherein:
   (a) said piston second portion area being between 15 to 40 times said piston first portion area.

25. A system as defined in claim 11, further comprising:
   (a) said piston including a bell having a circular portion, a lateral cylindrical wall, and an axial extension;
   (b) said hermetic chamber being generally cylindrical and adapted for receipt of said bell; and,
   (c) an hermetic flexible membrane disposed between said bell and said hermetic chamber for retaining said gaseous medium therein.

26. A system as defined in claim 25, further comprising:
   (a) a platform associated with marine medium surface; and,
   (b) a rise and descent assembly secured to said platform and said system for raising and lowering said system.

27. A system as defined in claim 1, wherein:
   (a) said valve means adapted for opening at a pre-selected depth associated with a pre-selected marine medium pressure whereby said high-pressure chamber pressure is less than said marine medium pressure.

28. A system as defined in claim 27, wherein:
   (a) said valve means adapted for sweeping seawater into said high-pressure chamber for removing concentrated seawater from said high-pressure chamber.

* * * * *